Nov. 19, 1963   R. S. M. MOFFATT ETAL   3,111,027
ULTRASONIC TEST APPARATUS
Filed Dec. 23, 1960
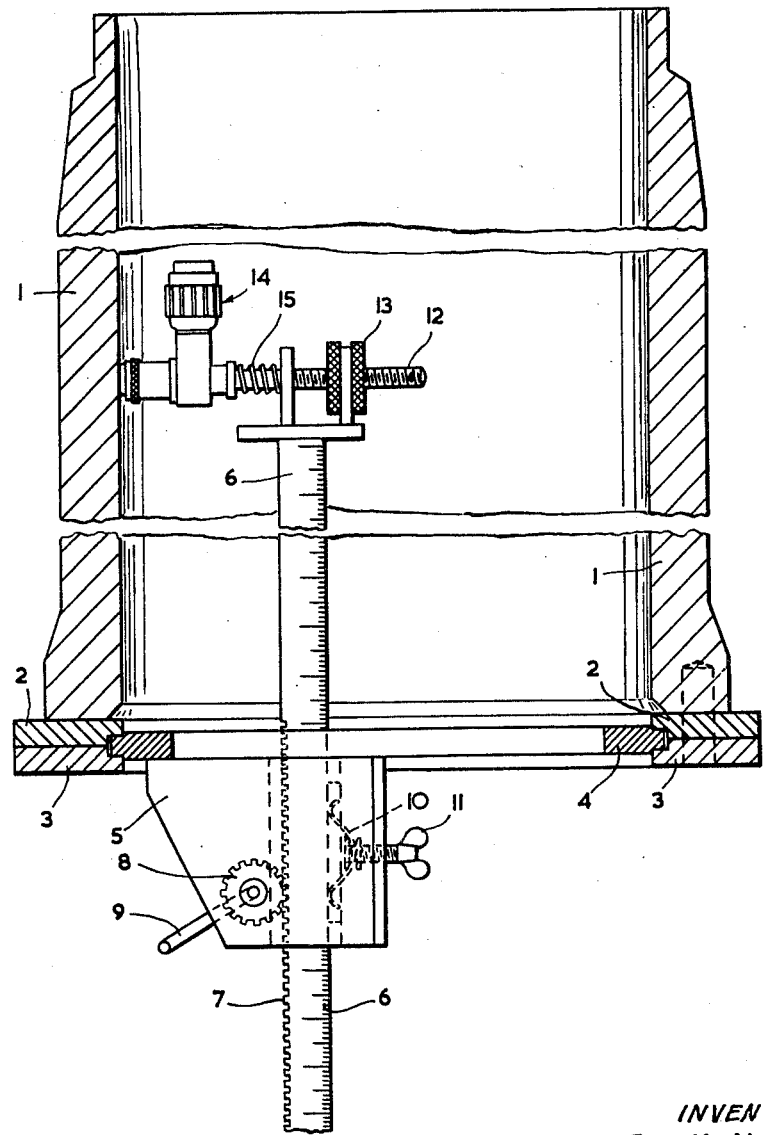
INVENTORS
R. S. M. Moffatt
Kenneth Storer
ATTORNEYS

United States Patent Office 3,111,027
Patented Nov. 19, 1963

3,111,027
ULTRASONIC TEST APPARATUS
Robert S. M. Moffatt and Kenneth Storer, Darlington, England, assignors to Whessoe Limited
Filed Dec. 23, 1960, Ser. No. 78,037
2 Claims. (Cl. 73—67.8)

The specification of applicants' U.S. Patent No. 3,002,375 describes apparatus for adjustably supporting an ultrasonic test probe so as to couple it successively to a plurality of different points on the wall of a body shaped as a surface of revolution, comprising a support member adapted to be mounted on the body for rotation about the axis thereof, a pillar mounted on the support member and extending parallel to the axis of the body, an arm pivotally mounted on the pillar at a point adjustable longitudinally of the pillar so that the arm can swing radially of the body, and a probe carried on the arm, the arm being biased to swing about its pivot until the probe is brought into coupled relationship with the wall of the body. The present invention provides improvements in or modifications of the apparatus forming the subject of the said specification.

A particular form of apparatus in accordance with the present invention is shown by way of example in the accompanying drawing, which represents a vertical section through the assembly.

Referring to the drawing, it is assumed that it is required to examine by the use of ultrasonic vibrations some parts at least of the wall of a vertically disposed pipe 1, for example in order to inspect an annular weld between the pipe and a plate (not here shown), through which the pipe passes, as shown in the drawings of the above mentioned specification.

For the purpose of test two rings 2, 3 are secured one above the other against the lower end of the pipe 1, the inner faces of these rings being recessed so as to provide an inwardly facing annular channel. This channel receives the periphery of a support member 4, which is thus secured to the pipe so as to be rotatable about the axis thereof. The support member 4 includes an annular peripheral portion, a diametrically extending bar, and a box-like housing 5 which depends from the bar to one side of the centre. The housing 5 is shaped to constitute a guide for a vertically adjustable pillar 6 which projects upwardly into the interior of the pipe 1, parallel to the axis thereof. The lower part at least of column 6 is formed with rack teeth 7 which engage with a pinion 8 rotatably supported in the housing and operated by a hand crank 9. A spring 10 bears against the column and can be adjusted by means of a thumb screw 11, so that the column will be held against displacement from any position to which it is adjusted by operation of handle 9. The upper end of column 6 supports a horizontal arm, formed by a rod 12, which projects radially towards the nearest point of the wall of pipe 1 and can be adjusted longitudinally by means of a nut 13. Arm 12 supports the ultrasonic probe 14, which is slidable longitudinally of the arm and is pressed into coupled relation with the wall of pipe 1 by a spring 15.

It will be appreciated that by appropriately rotating support member 4 and vertically adjusting column 6, the probe 14 can be coupled to any desired point on the inner surface of pipe 1 within the range of adjustment of the parts. Graduations on column 6 co-operating with an index mark on the support member 4, 5 and angular graduations on the support member co-operating with an index mark on ring 3 (or vice versa) allow the position of the probe relative to the pipe to be read off at any time.

Instead of mounting the rotary support member 4, 5 in a bearing formed by rings 2, 3 the support member may be mounted upon rollers as in the arrangement shown in FIGURE 4 of the above mentioned specification. Alternatively, the apparatus may be mounted on the upper end of the pipe and depend into it, as in the arrangement shown in FIGURES 1 to 3 of that specification. For use in this way, the apparatus shown in the accompanying drawing may be employed in inverted position, a mounting ring being secured to the upper end of the pipe and the rings 2, 3 secured to this mounting ring. Instead of supporting the probe at a fixed point along the length of the pillar 6 and making the pillar adjustable in a longitudinal direction as illustrated, the pillar may be fixed to the rotary support member and the probe made adjustable longitudinally of the pillar, as in both the arrangements shown in the above mentioned specification. Many other modifications may be made to the apparatus described and illustrated.

We claim:
1. Apparatus for adjustably supporting an ultrasonic probe so as to couple it successively to a plurality of different points on the wall of a hollow body shaped as a surface of revolution, said apparatus comprising a support member in the form of a ring adapted to be mounted on one end of the body for rotation about the axis thereof, a guide mounted on the ring, a pillar extending slidably through the guide in a direction parallel to the axis of the body, adjusting means for moving the pillar longitudinally relative to the guide and for holding it against displacement from any position to which it has been adjusted by said means, a probe supported on the pillar for movement in a direction radial of the body and means for biasing the probe into coupled relationship with the wall of the body.
2. Apparatus for adjustably supporting an ultrasonic probe so as to couple it successively to a plurality of different points on the wall of a hollow body shaped as a surface of revolution, said apparatus comprising a support member in the form of a ring adapted to be mounted on one end of the body for rotation about the axis thereof, a housing on the ring, a pillar extending through the housing into the interior of the body in a direction parallel to the axis of the body, the pillar being guided for longitudinal movement by the housing, rack teeth on the pillar, a pinion rotatably mounted on the housing and meshing with said rack teeth, friction means on the housing engaging the pillar and holding it against displacement from any position to which it has been adjusted by rotation of the pinion, an arm supported on the pillar within the body and extending in a direction radial of the body, means on the pillar adjustably displacing the arm relative to the pillar in said radial direction, a probe slidably supported on the arm and means biasing the probe outwardly along said arm into coupled relationship with the wall of the body.

References Cited in the file of this patent
UNITED STATES PATENTS
2,723,357    Van Valkenburg et al. ____ Nov. 8, 1955